(12) United States Patent
Wang et al.

(10) Patent No.: US 10,064,071 B2
(45) Date of Patent: *Aug. 28, 2018

(54) METHOD AND APPARATUS FOR ANALYZING CAUSE OF LINK FAILURE

(71) Applicant: FUJITSU LIMITED, Kawasaki-shi, Kanagawa (JP)

(72) Inventors: Weiwei Wang, Beijing (CN); Zhaojun Li, Beijing (CN); Ningjuan Chang, Beijing (CN); Haibo Xu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,292

(22) Filed: Jul. 2, 2014

(65) Prior Publication Data
US 2014/0313907 A1 Oct. 23, 2014

Related U.S. Application Data

(63) Continuation of application No. PCT/CN2012/070673, filed on Jan. 20, 2012.

(51) Int. Cl.
*H04W 24/02* (2009.01)
*H04W 36/34* (2009.01)
*H04L 12/26* (2006.01)

(52) U.S. Cl.
CPC .............. *H04W 24/02* (2013.01); *H04L 43/10* (2013.01); *H04W 36/34* (2013.01)

(58) Field of Classification Search
None
See application file for complete search history.

(56) References Cited

U.S. PATENT DOCUMENTS

2010/0173626 A1 7/2010 Catovic et al.
2011/0117908 A1 5/2011 Huang et al.
2011/0207452 A1 8/2011 Grob-Lipski et al.
(Continued)

FOREIGN PATENT DOCUMENTS

CN 101562850 A 10/2009
CN 101959262 A 1/2011
(Continued)

OTHER PUBLICATIONS

The partial supplementary European search report issued by the European Patent Office for corresponding European Patent Application No. 12866018.0, mailed on Oct. 1, 2015.
(Continued)

*Primary Examiner* — Min Jung
(74) *Attorney, Agent, or Firm* — Myers Wolin, LLC

(57) ABSTRACT

A method and apparatus for analyzing cause of link failure, includes: receiving, by a base station where the user equipment is present when a link failure is observed by the user equipment, identification information transmitted by other base stations or the user equipment, the identification information including: identification associated with the user equipment and/or identification of the user equipment in the base station; and determining, by the base station when it determines that the identification information is stored in the base station, that the link failure is resulted from a handover preparation failure.

11 Claims, 11 Drawing Sheets

(56) References Cited

U.S. PATENT DOCUMENTS

| | | | | |
|---|---|---|---|---|
| 2011/0212720 | A1* | 9/2011 | Hamalainen | H04W 24/02 455/423 |
| 2011/0310791 | A1* | 12/2011 | Prakash | H04W 24/02 370/315 |
| 2012/0069732 | A1* | 3/2012 | Xu | H04W 76/027 370/221 |
| 2012/0207128 | A1* | 8/2012 | Wang | H04W 36/0027 370/331 |
| 2013/0003648 | A1 | 1/2013 | Hahn et al. | |
| 2013/0115959 | A1* | 5/2013 | Amirijoo | H04W 36/0083 455/440 |
| 2013/0163439 | A1* | 6/2013 | Jia | H04W 92/16 370/242 |
| 2013/0272268 | A1* | 10/2013 | Xu | H04W 76/066 370/331 |
| 2014/0194123 | A1 | 7/2014 | Wang et al. | |
| 2014/0228032 | A1* | 8/2014 | Jung | H04W 8/02 455/436 |
| 2014/0313907 | A1 | 10/2014 | Wang et al. | |
| 2015/0341984 | A1 | 11/2015 | Wang et al. | |
| 2016/0323758 | A1* | 11/2016 | Goerke | H04W 24/02 |

FOREIGN PATENT DOCUMENTS

| | | |
|---|---|---|
| CN | 102131215 A | 7/2011 |
| CN | 102273249 A | 12/2011 |
| JP | 2011-530912 A | 12/2011 |
| JP | 2012-518923 A | 8/2012 |
| JP | 5858173 B2 | 12/2015 |
| WO | 2010/080849 A2 | 7/2010 |
| WO | 2010/080849 A9 | 7/2010 |
| WO | 2010/094236 A1 | 8/2010 |
| WO | 2010/121885 A1 | 10/2010 |
| WO | 2011/133079 A1 | 10/2011 |

OTHER PUBLICATIONS

Fujitsu, "Radio link failure due to handover preparation failure", Agenda Item: 11.1.2, 3GPP TSG-RAN WG3 Meeting #75, R3-120097, Dresden, Germany, Feb. 6-10, 2012.
Nokia Siemens Networks et al, "Radio Link Failure Recovery", Agenda Item: 4.5.1, 3GPP TSG-RAN WG2 Meeting #58, R2-072382, Orlando, USA, Jun. 25-29, 2007.
Huawei, "Further description and detection of MRO problem cases", Agenda Item: 10.2.1, 3GPP TSG-RAN WG3 Meeting #65, R3-091765, Shenzen, China, Aug. 24-28, 2009.
Nortel, "Multi-eNB Handover preparation for Radio Link Failure Recovery", Agenda Item: 7.3.14, 3GPP TSG-RAN WG3 Meeting #57bis, R3-071906, Sophia Antipolis, France, Oct. 8-11, 2007.
Nokia et al, "Handover Failure Recovery", Agenda Item: 4.11.1, 3GPP TSG-RAN WG2 Meeting #58, R2-071717, R2-071231, Kobe, Japan, May 7-11, 2007.
NEC, "way forward for Inter-RAT MRO", Agenda Item: 17.1.2, 3GPP TSG-RAN WG3 Meeting #68, R3-101581, Montreal, Canada, May 10-14, 2010.
Notice of Preliminary Rejection issued by the Korean Intellectual Property Office for corresponding Korean Patent Application No. 10-2014-7021360, mailed on Aug. 7, 2015, with English translation.
3GPP TS 36.300 V10.6.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Dec. 2011.
International Search Report for corresponding PCT Application No. PCT/CN2012/070673, mailed Nov. 1, 2012.
The Extended European Search Report (EESR) issued for corresponding European Patent Application No. 12866018.0 mailed on Feb. 2, 2016.
Notice of Preliminary Rejection issued by the Korean Intellectual Property Office for corresponding Korean Patent Application No. 10-2014-7021360, mailed on Feb. 19, 2016, with English translation.
Notice of Final Rejection issued by the Korean Intellectual Property Office for corresponding Korean Patent Application No. 10-2014-7021360, dated Jun. 20, 2016, with English translation.
Notice of Amendment Dismissal issued by the Korean Intellectual Property Office for corresponding Korean Patent Application No. 10-2014-7021360, dated Jun. 20, 2016, with English translation.
Notice of Preliminary Rejection issued by the Korean Intellectual Property Office for corresponding Korean Patent Application No. 10-2016-7013527, dated Aug. 3, 2016, with English translation.
First Office Action issued for corresponding Japanese Patent Application No. 2015-245578 dated Sep. 20, 2016 with an English translation.
Third Notification of Office Action issued by the State Intellectual Property Office of China for corresponding Chinese Patent Application No. 201280054584.X, dated Nov. 1, 2017, with an English translation.
Non-Final Office Action issued by the United States Patent and Trademark Office for corresponding U.S. Appl. No. 15/245,920, dated Jan. 3, 2017.
First Notification of Office Action issued by the State Intellectual Property Office of China for corresponding Chinese Patent Application No. 201280054584.X, dated Dec. 30, 2016, with an English translation.
Notification of Reasons for Refusal issued for corresponding Japanese Patent Application No. 2015-245578 dated May 16, 2017 with an English translation.
Ericsson: "MRO for HetNet mobility scenarios", Agenda Item: 20, 3GPP TSG-RAN WG3 Meeting #73bis, R3-112599, Zhuhai, China, Oct. 10-14, 2011.
MediaTek: "RLF report contents", Agenda Item: 6.7, 3GPP TSG-RAN WG2 Meeting #73bis, R2-112192, Shanghai, China, Mar. 11-15, 2011.
Communication pursuant to Article 94(3) EPC issued for corresponding European Patent Application No. 12866018.0 dated Mar. 16, 2017.
Non-Final Office Action issued by the United States Patent and Trademark Office for corresponding U.S. Appl. No. 15/245,920, dated Jul. 12, 2017.
Second Notification of Office Action issued by the State Intellectual Property Office of China for corresponding Chinese Patent Application No. 201280054584.X, dated Jul. 28, 2017, with an English translation.
Notification of Reasons for Refusal issued by the Japan Patent Office for corresponding Japanese Patent Application No. 2017-053735, dated Apr. 10, 2018, with an English translation.
Decision of Intellectual Property Trial and Appeal Board ("IPTAB") issued for corresponding Korean Patent Application No. 10-2014-7021360, dated May 11, 2018, with an English translation.

\* cited by examiner

METHOD AND APPARATUS FOR ANALYZING CAUSE OF LINK FAILURE

CROSS-REFERENCE TO RELATED APPLICATIONS

This is a continuation of International Application No. PCT/CN2012/070673, filed on Jan. 20, 2012, now pending, the contents of which are herein wholly incorporated by reference.

TECHNICAL FIELD

The present invention relates to the field of communications, and in particular to a method and apparatus for analyzing cause of a link failure.

BACKGROUND

In a self-optimizing network, terminal equipment will transmit a link failure report to a network side when a link failure occurs, and then the network side will determine a cause of the link failure according to the report.

In the implementation of the present invention, the inventors found that a defect of the relevant art resides in that the network side will determine whether it is a problem of incorrect setting of a handover parameter or a problem of coverage according to link failure information provided by the terminal equipment; however, an existing method of determination cannot determine whether it is resulted from a handover preparation failure, thereby resulting in that the network side cannot optimize correctly.

SUMMARY

Embodiments of the present invention provide a method for analyzing cause of a link failure, base station and user equipment. With the method, a link failure resulted from a handover preparation failure may be analyzed, thereby enabling the network side to optimize the network more accurately.

According to one aspect of the embodiments of the present invention, there is provided a method for analyzing cause of a link failure, including: receiving, by a base station where user equipment is present when a link failure is observed by the user equipment, identification information transmitted by other base stations or the user equipment, the identification information including: identification associated with the user equipment and/or identification of the user equipment in the base station; and determining, by the base station when it determines that the identification information is stored in the base station, that the link failure is resulted from a handover preparation failure.

According to another aspect of the embodiments of the present invention, there is provided a method for analyzing cause of a link failure, including: receiving, by a base station after establishing connection with user equipment successfully, identification information transmitted by the user equipment, the identification information including: identification associated with the user equipment and/or identification of the user equipment in a base station where the user equipment is present when the link failure is observed by the user equipment; and transmitting the identification information to the base station where the user equipment is present when the link failure is observed by the user equipment.

According to still another aspect of the embodiments of the present invention, there is provided a method for analyzing cause of a link failure, including: generating, by user equipment when a link failure occurs, identification information associated with the user equipment in attempting to reestablish connection; and transmitting the identification information by the user equipment to a base station after the user equipment establishes connection with the base station successfully, wherein the identification information includes: identification associated with the user equipment and/or identification of the user equipment in a base station where the user equipment is present when the link failure is observed by the user equipment.

According to still another aspect of the embodiments of the present invention, there is provided a base station, which is a base station where user equipment is present when a link failure is observed by the user equipment, the base station including:

a first receiving unit configured to receive identification information transmitted by other base stations or the user equipment, the identification information includes: identification associated with the user equipment and/or identification of the user equipment in the base station where the user equipment is present when the link failure is observed by the user equipment; and a first processing unit configured to determine that the link failure is resulted from a handover preparation failure when the base station determines that the identification information is stored in the base station.

According to still another aspect of the embodiments of the present invention, there is provided a base station, including:

a third receiving unit configured to receive identification information transmitted by user equipment after the base station establishes connection with the user equipment successfully, the identification information including: identification associated with the user equipment and/or identification of the user equipment in a base station where the user equipment is present when the link failure is observed by the user equipment; and a third transmitting unit configured to transmit the identification information to the base station where the user equipment is present when the link failure is observed by the user equipment.

According to still another aspect of the embodiments of the present invention, there is provided user equipment, including:

a sixth processing unit configured to generate, when a link failure occurs in the user equipment, identification information associated with the user equipment in attempting to reestablish connection; and a fourth transmitting unit configured to transmit the identification information to a base station after connection with the base station is successfully established, the identification information including: identification associated with the user equipment and/or identification of the user equipment in a base station where the user equipment is present when the link failure is observed by the user equipment.

According to still another aspect of the embodiments of the present invention, there is provided a method for analyzing cause of a link failure, including: transmitting, by a base station where user equipment is present, when the user equipment is to be handed over, handover request messages to all possible target base stations; receiving messages of handover preparation failure fed back by the target base stations in response to the handover request messages; and transmitting indication for handover preparation failure to the user equipment.

According to still another aspect of the embodiments of the present invention, there is provided a method for analyzing cause of a link failure, including: receiving, by user equipment, indication for handover preparation failure transmitted by a base station where the user equipment is present; and transmitting, by the user equipment to the base station or other base stations after the link of the user equipment fails and the user equipment establishes connection with the base station or other base stations, the indication for handover preparation failure.

According to still another aspect of the embodiments of the present invention, there is provided a method for analyzing cause of a link failure, including: receiving, by a base station after establishing connection with user equipment successfully, indication for handover preparation failure transmitted by the user equipment; and not transmitting or transmitting the indication for handover preparation failure to the base station where the user equipment is present when the link failure is observed by the user equipment.

According to still another aspect of the embodiments of the present invention, there is provided a base station, including:

a fifth transmitting unit configured to transmit handover request messages to all possible target base stations when user equipment is to be handed over;

a fourth receiving unit configured to receive messages of handover preparation failure fed back by the target base stations in response to the handover request messages; and a seventh processing unit configured to transmit indication for handover preparation failure to the user equipment.

According to still another aspect of the embodiments of the present invention, there is provided user equipment, including:

a sixth receiving unit configured to receive indication for handover preparation failure transmitted by a base station where the user equipment is present; and an eighth processing unit configured to transmit to the base station or other base stations the indication for handover preparation failure when the link fails and after the user equipment establishes connection with the base station or other base stations.

According to still another aspect of the embodiments of the present invention, there is provided a base station, including:

a seventh receiving unit configured to receive indication for handover preparation failure transmitted by user equipment after the base station establishes connection with the user equipment successfully; and a ninth processing unit configured not to transmit or transmit the indication for handover preparation failure to the base station where the user equipment is present when the link failure is observed by the user equipment.

According to still another aspect of the embodiments of the present invention, there is provided a computer-readable program, wherein when a program is executed in a base station, the program enables the computer to carry out the method for analyzing cause of a link failure as described above in the base station.

According to still another aspect of the embodiments of the present invention, there is provided a storage medium in which a computer-readable program is stored, wherein the computer-readable program enables a computer to carry out the method for analyzing cause of a link failure as described above in a base station.

According to still another aspect of the embodiments of the present invention, there is provided a computer-readable program, wherein when a program is executed in user equipment, the program enables the computer to carry out the method for analyzing cause of a link failure as described above in the user equipment.

According to still another aspect of the embodiments of the present invention, there is provided a storage medium in which a computer-readable program is stored, wherein the computer-readable program enables a computer to carry out the method for analyzing cause of a link failure as described above in user equipment.

The advantage of the embodiments of the present invention resides in that a link failure resulted from a handover preparation failure may be analyzed, thereby enabling the network side to optimize the network more accurately, and solving problems existed in the relevant art.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including/comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The foregoing and other objects, features and advantages of the embodiments of the present invention will be more apparent from the following detailed description with reference to the accompanying drawings, in which.

DETAILED DESCRIPTION

Various embodiments of the present invention are described as follows with reference to the drawings. These embodiments are illustrative only and are not intended to limit the present invention. For easy understanding of the principle and embodiments of the present invention by those skilled in the art, the embodiments of the present invention are described taking analysis of cause of link failure of an SON network as an example. However, it should be understood that the present invention is not limited to the above system, and is applicable to other systems related to causes of link failure.

Currently, in an existing scheme, after a link failure occurs in user equipment (UE), a network side will determine whether it is a problem of incorrect setting of a handover parameter or a problem of coverage according to link failure information provided by terminal equipment; however, the existing scheme cannot determine that some link failure is resulted from a handover preparation failure, thereby resulting in incorrect optimization of the network side. Therefore, embodiments of the present invention may provide related information to the network side, so that the network side may distinguish a link failure resulted from a handover preparation failure, thereby assisting in optimization of the network performance.

The embodiments of the present invention shall be described below in detail with reference to the accompanying drawings.

Figure 1:
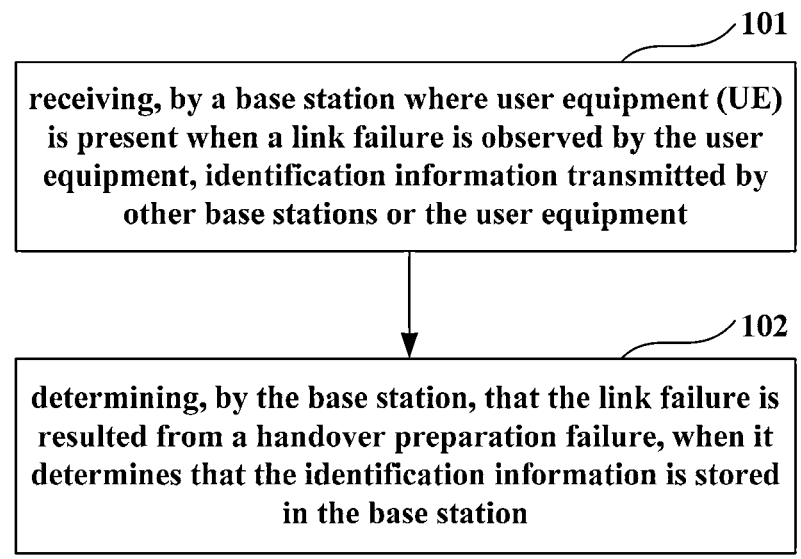
FIG. 1 is a schematic diagram of the method for analyzing cause of a link failure of Embodiment 1 of the present invention.

FIG. 1 is a schematic diagram of the method for analyzing cause of a link failure of Embodiment 1 of the present invention, which is addressed to a base station where user equipment (UE) is present when a link failure is observed by the user equipment (which is also a base station where the user equipment is present before the link of the user equipment fails). Furthermore, after the link of the user equipment fails, if a reconnection with the base station succeeds again, the base station is also a base station establishing connection with the user equipment successfully.

As shown in FIG. 1, the method includes:

step 101: receiving, by a base station where user equipment (UE) is present when a link failure is observed by the user equipment, identification information transmitted by other base stations or the user equipment, the identification information including: identification associated with the user equipment and/or identification of the user equipment in the base station;

in this embodiment, the identification information is information used by the user equipment in attempting to reestablish connection after the link fails;

wherein, after the link of the user equipment fails and the user equipment reestablishes connection with the base station successfully again, the base station receives identification information transmitted by the user equipment; furthermore, after the link of the user equipment fails and the user equipment establishes connection with other base stations successfully, the other base stations obtain the identification information from the user equipment;

wherein, the identification associated with the user equipment may be a unique identification list associated with the user equipment, such as a shortMAC-I list, reference to 3GPP TS36.331;

furthermore, the identification of the user equipment in the base station may be a cell radio network temporary identifier (C-RNTI);

in this embodiment, the identification information may be transmitted to the base station directly by the other base stations or the base station; and in this embodiment, the identification information may be included in any message for transmission to the base station;

for example, the identification information may be included in a link failure indication message for transmission to the base station;

furthermore, the identification information may be included in a report of link failure (RLF) by the other base stations or the user equipment, and the report of link failure may be included in a link failure indication message for transmission to the base station; in this case, besides the identification information, the report of link failure may further include other information, such as measurement information of a local cell and a neighboring cell when link failure occurs, and position information and speed information of the user equipment, etc., which are similar to those in the relevant art, and shall not be described herein any further.

step 102: determining, by the base station where the user equipment is present when the link failure is observed by the user equipment, that the link failure is resulted from a handover preparation failure, when it determines that the identification information is stored in the base station;

in this embodiment, after receiving the identification information or the report of link failure and obtaining identification information therefrom, the base station may look up a locally prestored information list for whether the identification information is stored in the information list, and if yes, deems that the link failure is resulted from a handover preparation failure.

It can be seen from the above embodiment that the base station where the user equipment is present when the link failure is observed by the user equipment may determine by using the received identification information and the prestored local information that the link failure is resulted from a handover preparation failure, but not from a problem of incorrect setting of a handover parameter or a problem of coverage, thereby the base station may ignore the link failure message, and assisting in optimizing the network more accurately.

Figure 2:
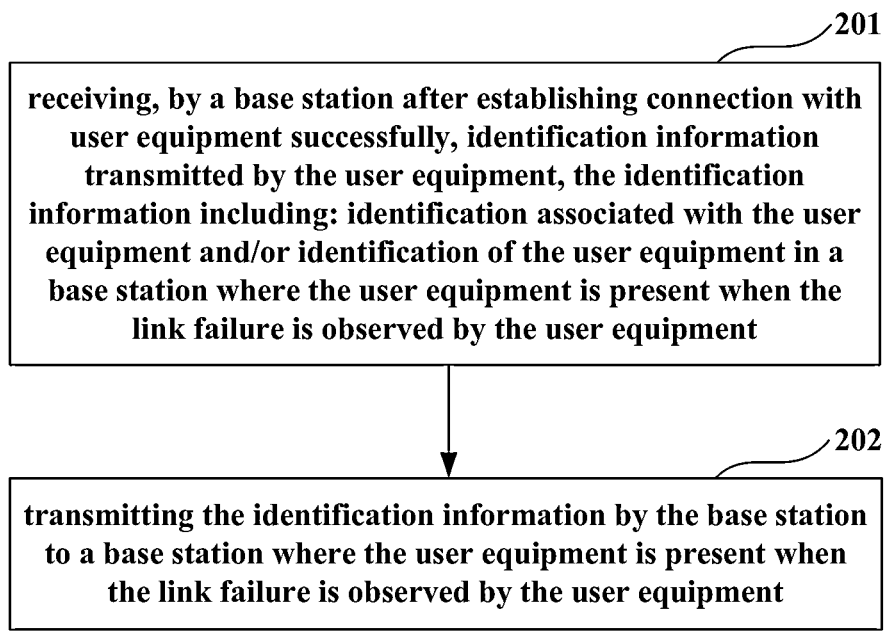
FIG. 2 is a schematic diagram of the method for analyzing cause of a link failure of Embodiment 2 of the present invention.

FIG. 2 is a schematic diagram of the method for analyzing cause of a link failure of Embodiment 2 of the present invention, which is addressed to a base station that establishes connection with user equipment successfully when a link failure occurs in the user equipment. The base station is not a base station where the user equipment is present when the user equipment observes the link failure, and may be a user equipment neighboring or not neighboring the base station where the user equipment is present when the user equipment observes the link failure.

As shown in FIG. 2, the method includes:

step 201: receiving, by a base station after establishing connection with user equipment successfully, identification information transmitted by the user equipment, the identification information including: identification associated with the user equipment and/or identification of the user equipment in a base station where the user equipment is present when the link failure is observed by the user equipment;

in this embodiment, the identification information is information used by the user equipment in attempting to reestablish connection after the link fails; wherein, after the link fails, the user equipment attempts to reestablish connection with the base station, and the base station in attempting to reestablish connection with the user equipment may be any base station, such as a base station where the user equipment is present when the user equipment observes the link failure, and another base station neighboring or not neighboring the base station where the user equipment is present when the user equipment observes the link failure;

a manner for transmitting the identification information by the user equipment is as described in Embodiment 1, which shall not be described herein any further;

step 202: transmitting the identification information by the base station to a base station where the user equipment is present when the link failure is observed by the user equipment;

in this embodiment, the base station may directly transmit the identification information to the base station where the user equipment is present when the link failure is observed by the user equipment, or the identification information may be included in a report of link failure for transmission to the base station where the user equipment is present when the link failure is observed by the user equipment; details are as described in Embodiment 1, which shall not be described herein any further;

in this embodiment, when the identification information is included in a report of link failure for transmission, the report of link failure may be transmitted via RLF indication to the base station where the user equipment is present when the link failure is observed by the user equipment;

in this way, the base station where the user equipment is present when the link failure is observed by the user equipment may determine whether the link failure is resulted from a handover preparation failure by using the obtained identification information and locally stored information; details are as described in Embodiment 1, which shall not be described herein any further.

Figure 3:
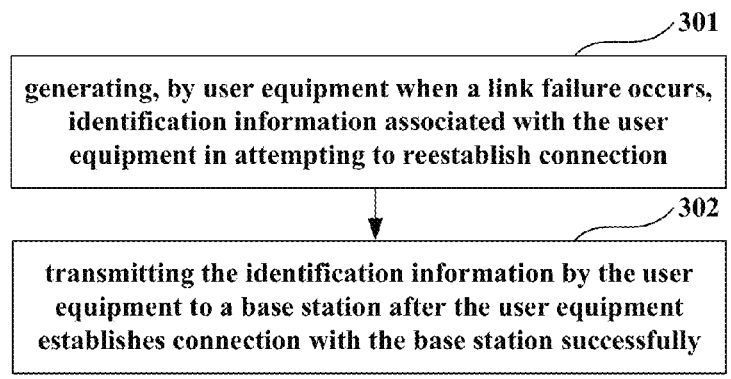
FIG. 3 is a schematic diagram of the method for analyzing cause of a link failure of Embodiment 3 of the present invention.

FIG. 3 is a schematic diagram of the method for analyzing cause of a link failure of Embodiment 3 of the present invention, which is addressed to user equipment that attempts to reestablish connection or establish connection with any base station when a link failure occurs, such as a base station where the user equipment is present when the user equipment observes the link failure, or another base station neighboring or not neighboring the base station where the user equipment is present when the user equipment observes the link failure.

As shown in FIG. 3, the method includes:

step 301: generating, by user equipment when a link failure occurs, identification information associated with the user equipment in attempting to reestablish connection;

in this embodiment, the base station in attempting to reestablish connection with the user equipment may be any base station, which is as described above, and shall not be described herein any further;

in this embodiment, when the base station where the user equipment is present cannot select an appropriate target base station after initiating handover requests to all possible target base stations of the user equipment, hence, it cannot transmit a handover command to the user equipment; the user equipment may perform cell selection, then attempts to reestablish connection with a selected base station, and generates identification information associated with the user equipment during the attempting to reestablish, information included in the identification information being as described in embodiments 1 and 2, such as shortMAC-I, and/or C-RNTI; wherein, the shortMAC-I may be different for different user equipments, and for the same user equipment, the shortMAC-I may be different for different target cells;

furthermore, the target base station is a base station neighboring the base station where the user equipment is present when the user equipment observes the link failure;

wherein, the user equipment (UE) reestablishes radio resource control (RRC) connection with the base station, with a detailed process being similar to the relevant art, which shall be described in an embodiment below, and shall not be described herein any further.

step 302: transmitting the identification information by the user equipment to a base station after the user equipment establishes connection with the base station successfully;

in this embodiment, if the attempting to reestablish fails, the user equipment may perform cell selection after a period of time, and establish connection with a selected base station successfully; and the base station establishing connection with the user equipment successfully may be any base station, such as a base station where the user equipment is present when the user equipment observes the link failure, and may be a base station neighboring or not neighboring the base station where the user equipment is present when the user equipment observes the link failure;

in this embodiment, a manner for transmitting the identification information by the user equipment is as described in embodiments 1 and 2 above, that is, the identification information may be transmitted to the base station directly via any message, the identification information may also be included in a link failure indication message for transmission to the base station, and a link failure report including the identification information may be included in an indication message for transmission to the base station.

It can be seen from the above embodiment that after establishing connection with a certain base station successfully, the user equipment transmits identification information to the base station; wherein, the identification information is information used by the user equipment in attempting to reestablish connection; in this way, after receiving the identification information, the base station may transmit the identification information to a base station where the user equipment is present when it observes the link failure; thus, the base station where the user equipment is present when it observes the link failure may use the received identification information and locally prestored information to determine that the link failure is resulted from a handover preparation failure, but not from a problem of setting of a handover parameter or a coverage problem, so that the base station may ignore the link failure message, thereby assisting in optimizing the network more accurately.

The method for analyzing cause of a link failure of the embodiment of the present invention shall be described below in particular scenarios with reference to the accompanying drawings. For example, when a link failure occurs in user equipment, the base station where the user equipment is present (i.e. the base station where the user equipment is present when it observes the link failure) is base station A; in this embodiment, neighboring base stations of the base station A may include base station B and base station C; and in an actual network system, the number of the neighboring base stations may be more than two, with a process of analysis being similar to the case with two neighboring base stations. Description shall be given herein taking the neighboring base stations include base station B and base station C as an example.

In this embodiment, a case shall be described where the user equipment reestablishes connection with the base station B through cell selection after the link failure occurs, and successfully establishes connection with the base station B through cell selection after the reestablishment fails. It should be noted that the base station which attempts to reestablish connection with the user equipment and establishes connection with the user equipment successfully may be any base station, such as the base station A, other base stations neighboring the base station A, such as the base station C, or other base stations not neighboring the base station A.

Figure 4A:
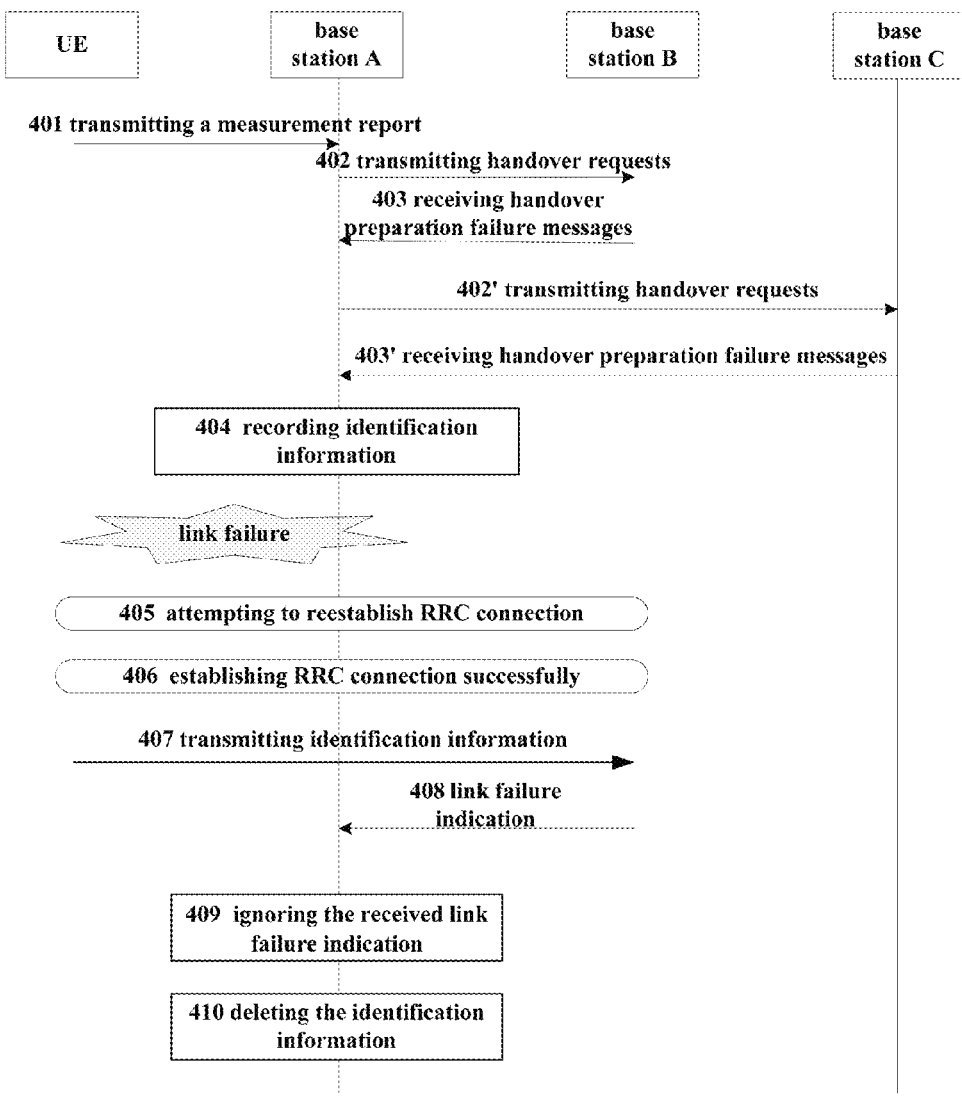
FIG. 4A is a schematic diagram of the method for analyzing cause of a link failure of Embodiment 4 of the present invention.

FIG. 4A is a schematic diagram of the method for analyzing cause of a link failure of Embodiment 4 of the present invention. As shown in FIG. 4A, the method includes:

step 401: transmitting a measurement report by the user equipment (UE) to the base station A where the user equipment is present;

in this embodiment, when a triggering event occurs, the user equipment (UE) transmits the measurement report to the base station A where the user equipment is present; for example, the triggering event may be that a difference obtained by subtracting signal quality of the base station B by signal quality of the base station A is greater than a threshold value;

wherein, the measurement report may include a measurement result of a local cell, or a measurement result of a neighboring cell, which are similar to the relevant art, and shall not be described herein any further;

steps 402 and 402': transmitting handover requests to multiple target base stations by the base station A where the user equipment (UE) is present when the user equipment (UE) needs to be handed over;

in this embodiment, the target base stations may be base stations neighboring the base station A, such the base stations B and C, and the base station A transmits the handover requests to the neighboring base stations B and C;

steps 403 and 403': feeding back handover preparation failure messages by the base stations B and C after receiving the handover requests;

step 404: recording identification information of the UE by the base station A after receiving the handover preparation failure messages, the identification information includes identification associated with the UE and/or identification of the UE in the base station A;

in this embodiment, the base station A may record the identification information in an identification information list; for example, the identification associated with the UE may be a unique identification list associated with the UE, such as a shortMAC-I list, as shown in Table 1; each identification in the list corresponds to a cell of a target base station; and the identification of the UE in the base station A may be, for example, a C-RNTI, which may be stored in another identification information list;

TABLE 1

Figure 5:
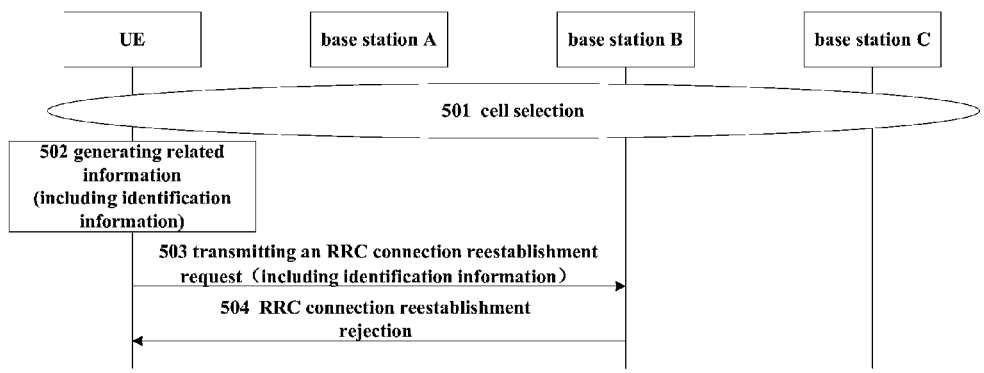
FIG. 5 is a flowchart of the user equipment in attempting to reestablish connection with a neighboring base station of Embodiment 4 of the present invention.
Figure 6:
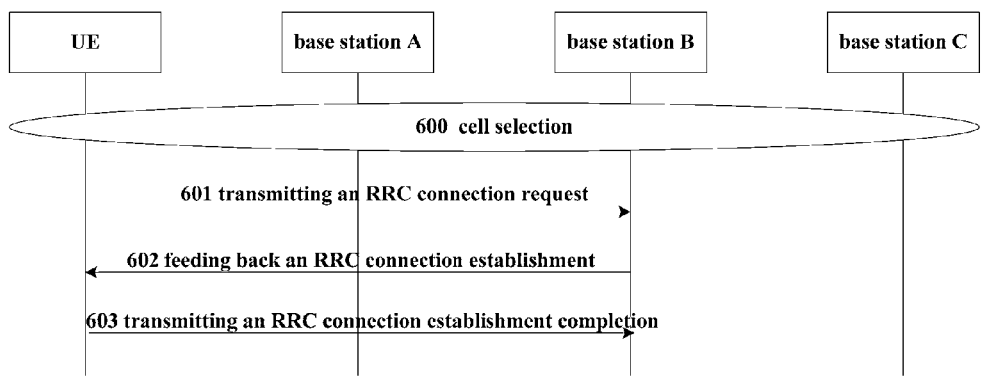
FIG. 6 is a flowchart of the user equipment in establishing RRC connection with a base station of Embodiment 4 of the present invention.

| shortMAC-I list |
| --- |
| shortMAC-I |
| shortMAC-I1 |
| shortMAC-I2 |
| . . . | step 405: attempting to reestablish connection by the UE after the link of the UE fails;

in this embodiment, the UE performs attempting to reestablish RRC connection; for example, the UE performs attempting to reestablish connection with the base station B, with a process of connection reestablishment being as shown in FIG. 5, which shall be described below, and shall not be described herein any further;

in the process of connection reestablishment, identification information for the base station B is generated, such as shortMAC-I, and C-RNTI; however, as there exists no context of the UE in the base station B, the connection reestablishment fails;

step 406: establishing RRC connection successfully with a base station by the UE;

in this embodiment, after the link fails, the UE establishes connection with the base station after a period of time, such as establishing connection with the base station B through cell selection, with a process of connection establishment being as shown in FIG. 6, which shall be described below, and shall not be described herein any further;

step 407: transmitting identification information generated in attempting to reestablish connection when the link failure occurs by the UE to the network side (i.e. the base station B) after the UE establishes RRC connection successfully with the base station B;

in this embodiment, the UE may transmit directly the identification information to the base station B via any message, and the identification information may also be included in a link failure report for transmission to the base station B;

and in this embodiment, for example, the identification information may be included in a link failure indication message for transmission to the base station B, the link failure indication message carrying an unique identification associated with the UE generated in attempting to reestablish connection, such as a shortMAC-I, and/or identification used of the UE in the base station A when the link failure occurs, such as an C-RNTI;

step 408: transmitting the identification information by the base station B to the base station A, i.e. the base station where the UE is present when the link failure occurs, after the base station B receives the identification information;

in this embodiment, the base station B transmits the identification information to the base station A via a link failure indication message;

however, a link failure report including the identification information may also be included in the link failure indication message for transmission to the base station A;

step 409: receiving by the base station A the link failure indication message transmitted by the base station B, and ignoring the link failure indication by the base station A if it is determined that the identification information included in the indication message has already been recorded in the base station A;

in this embodiment, the base station A looks up in a prestored identification information list, and determines whether the identification information included in the link failure indication message exists in the identification information list; if yes, it shows that the link failure of the UE is resulted from a handover preparation failure, thereby optimizing the network more accurately;

step 410: deleting the stored identification information corresponding to the user equipment by the base station A;

in this embodiment, if the identification associated with the UE in the identification information is the list shown in Table 1, the list is deleted; and if the identification information further includes the identification of the UE in the base station A, such as a C-RNTI, the base station also deletes the C-RNTI.

In this embodiment, the identification information list about the UE recorded by the base station A shall also be deleted in the following cases, which are described below.

Example 1 in steps 403 and 403', after all the handover requests associated with the UE are rejected, the UE finishes one successful handover preparation in the same base station, i.e. the base station A, that is, after the base station A where the UE is present transmits the handover request, when a target base station (the neighboring base station B or C) replies with a handover request response message, the identification list about the UE recorded in the base station side (such as Table 1) and/or the identification used by the UE in the base station A when the link failure occurs shall be deleted;

hence, before the link fails and after steps 403 and 403', the method further includes: transmitting a handover request again by the base station A to the neighboring base station, and when receiving a handover request response message fed back by the neighboring base station, deleting the information stored in the base station; wherein, the neighboring base station is the base station B or the base station C.

Example 2 after the identification information is recorded in step 404, after the identification information has been stored in the base station A for a period of time, the identification information list about the UE recorded in the base station side (Table 1) and/or the identification used by the UE in the base station A when the link failure occurs shall be deleted;

hence, the method further includes: deleting the stored information by the base station A when the storage time of the information stored in the base station A exceeds a predefined time.

Figure 4B:
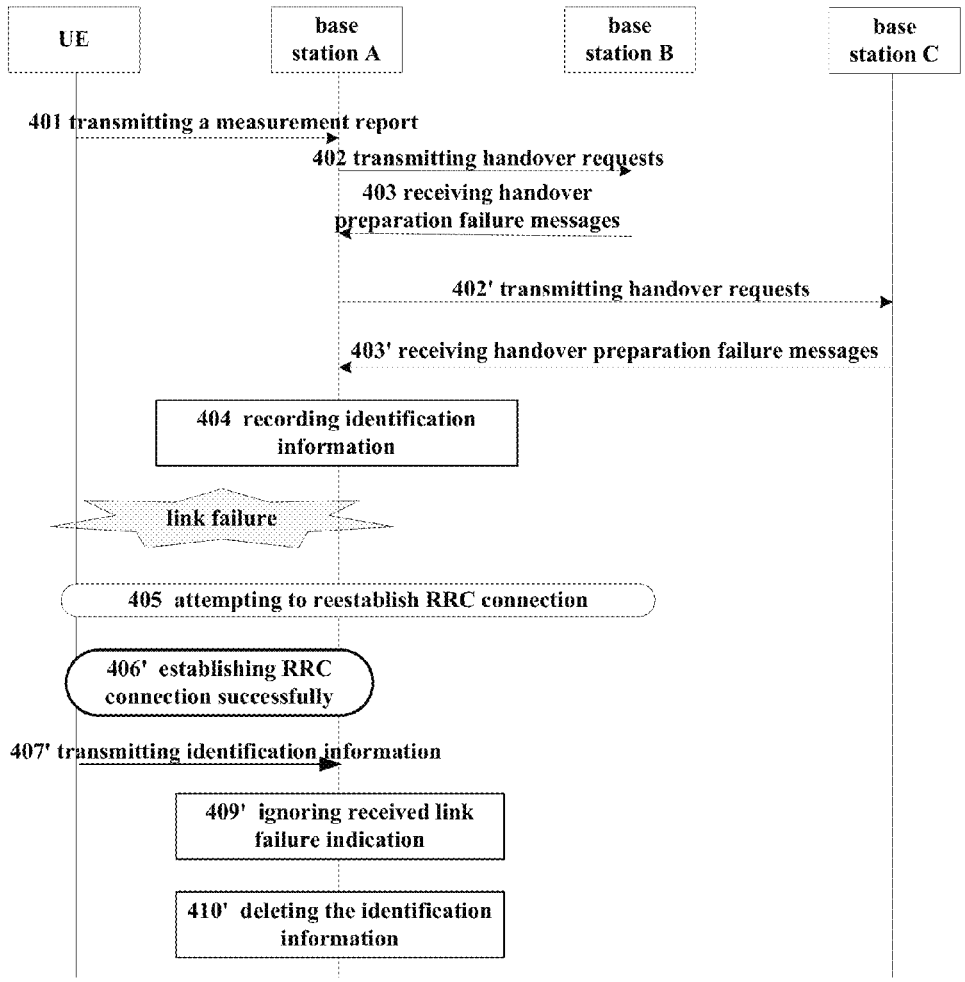
FIG. 4B is a schematic diagram of the method for analyzing cause of a link failure of Embodiment 5 of the present invention.

FIG. 4B is a schematic diagram of the method for analyzing cause of a link failure of Embodiment 5 of the present invention. As shown in FIG. 4B, it differs from Embodiment 4 shown in FIG. 4A by steps 406', 407' and 409', and other steps are similar to those in Embodiment 4; wherein, in step 406', in this embodiment, after the link fails, the UE establishes connection with a base station after a period of time; for example, it establishes connection with the base station A through cell selection, with a process of connection establishment being as shown in FIG. 6, which shall be described below, and shall not be described herein any further. In step 407', after establishing RRC connection with the base station A successfully, the UE transmits identification information generated in attempting to reestablish connection when the link failure occurs to the network side (i.e. the base station A). In step 409', after receiving the identification information, the base station A ignores the link failure indication if it is determined that the identification information included in the indication message has already been recorded in the base station A.

Figure 4C:
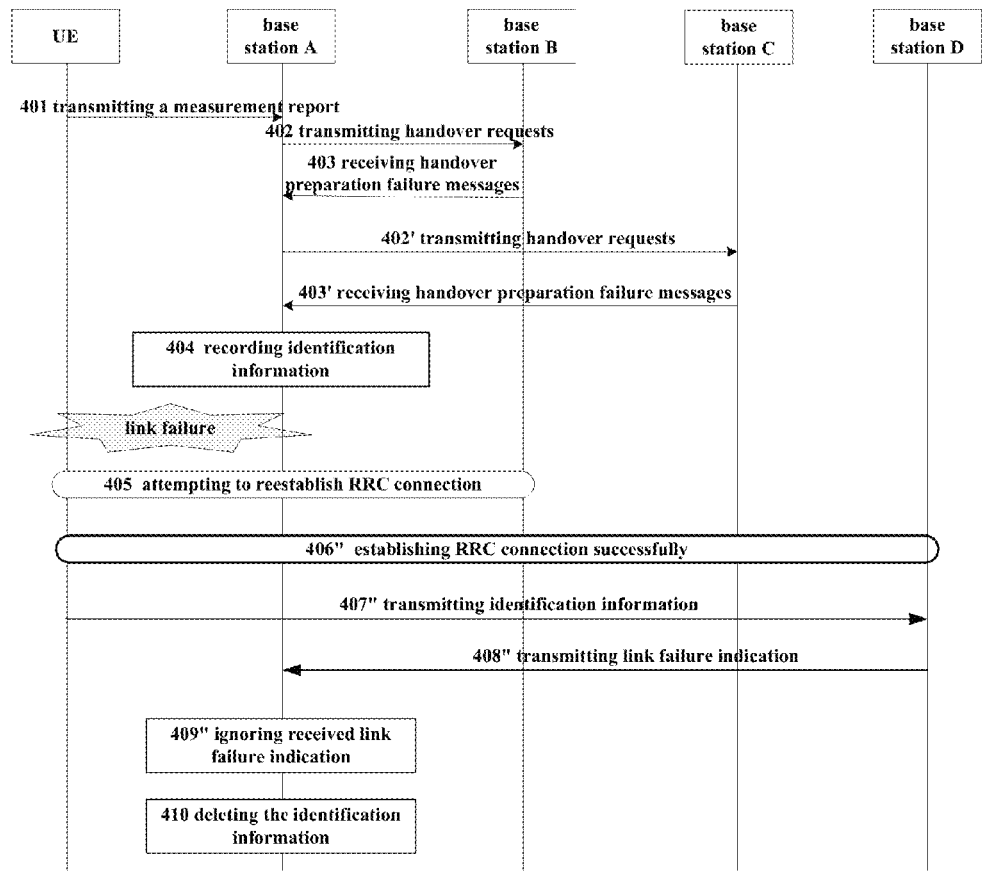
FIG. 4C is a schematic diagram of the method for analyzing cause of a link failure of Embodiment 6 of the present invention.

FIG. 4C is a schematic diagram of the method for analyzing cause of a link failure of Embodiment 6 of the present invention. As shown in FIG. 4C, it differs from Embodiment 4 shown in FIG. 4A by steps 406", 407" and 408". In this embodiment, in step 406", after the link fails, the user equipment (UE) establishes connection with a base station after a period of time; for example, it establishes connection with base station D through cell selection, the base station D at this moment being a base station not neighboring the base station A, with a process of connection establishment being as shown in FIG. 6, which shall not be described herein any further. In step 407", after establishing RRC connection with the base station D successfully, the UE transmits identification information generated in attempting to reestablish connection when the link failure occurs to the network side (i.e. the base station D). In step 408", after receiving the identification information by the base station D, for example, the identification information may be included in a link failure indication message by the base station D for transmission to the base station A; and other steps are similar to those in Embodiment 4, which shall not be described herein any further.

In the above embodiments shown in FIGS. 4A-4C, description is given taking the base station A as the base station establishing connection with the UE successfully, the neighboring base station B and the non-neighboring base station D, as examples. Furthermore, in the above embodiments, description is given taking that a base station attempting to reestablish connection with the UE is the neighboring base station B as an example. Other cases are similar to these ones, which shall not be described herein any further.

FIG. 5 is a flowchart of the process of user equipment in attempting to reestablish connection with a neighboring base station in Embodiment 4 of the present invention. As shown in FIG. 5, the method includes:

step 501: performing cell selection by the UE;

wherein, a process of selection is as in the relevant art, which shall not be described herein any further;

step 502: generating related information in an RRC connection reestablishment request message transmitted to base station B by the UE if the UE selects the base station B in step 501; wherein, the related information includes user identification information for the base station B;

for example, the identification information is shortMAC-I, or identification C-RNTI of the UE in the base station A;

step 503: transmitting an RRC connection reestablishment request by the UE to the base station B, the RRC connection reestablishment request includes the generated identification information; and step 504: feeding back an RRC connection reestablishment rejection message by the base station B to reject the reestablishment request, as there exists no context of the UE in the base station B.

FIG. 6 is a flowchart of the process of user equipment in establishing RRC connection with a base station in Embodiment 4 of the present invention. As shown in FIG. 6, the method includes:

step 600: performing cell selection;

wherein, a process of selection is as in the relevant art, which shall not be described herein any further;

step 601: transmitting an RRC connection request by the UE to a selected base station B;

step 602: feeding back an RRC connection establishment message to the UE by the base station B after receiving the RRC connection request; and step 603: transmitting an RRC connection establishment completion message to the base station B by the UE after receiving the RRC connection establishment message, thereby establishing connection between the UE and the base station B.

It can be seen from the above embodiment that after establishing connection with a base station successfully, the user equipment may transmit identification information to the base station, the identification information being information used by the user equipment in attempting to reestablish connection after the link fails; in this way, after receiving the identification information, the base station may transmit the identification information to a base station where the user equipment is present when it observes the link failure; thus, the base station may use the received identification information and locally prestored information to determine that the link failure is resulted from a handover preparation failure, but not from a problem of setting of a handover parameter or a coverage problem, so that the base station may ignore the link failure message, thereby assisting in optimizing the network more accurately; furthermore, the base station A may manage the recorded information and delete redundancy information in time, thereby saving the storage space of the base station.

A person of ordinary skill in the art may understand that all or part of the steps in the method carrying out the above embodiment may be carried out by related hardware instructed by a program. The program may be stored in a computer-readable storage medium. And when being executed, the program may include all or part of the steps in the method in the above embodiments, and the storage medium may include an ROM, an RAM, a floppy disc, and a compact disc, etc.

Embodiments of the present invention further provide a base station and user equipment, as described in the embodiments below. As the principles of the base station and the user equipment for solving problems are similar to those of the above methods based on a base station and user equipment, the implementation of the methods may be referred to for the implementation of the base station and user equipment, and the repeated parts shall not be described any further.

Figure 7:
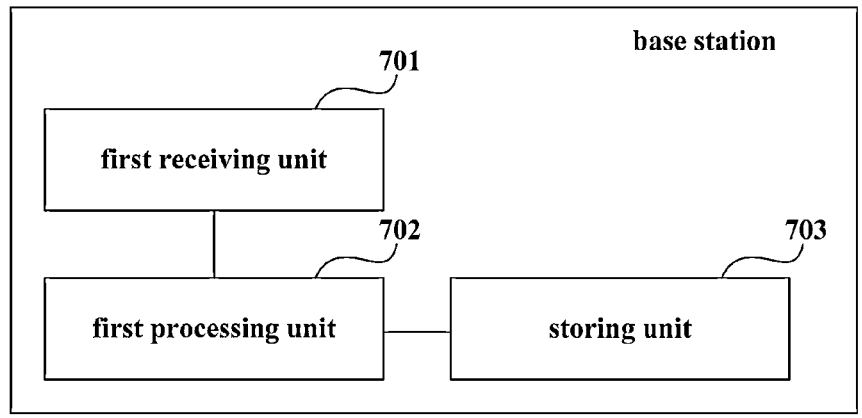
FIG. 7 is a schematic diagram of the structure of the base station of Embodiment 7 of the present invention.

FIG. 7 is a schematic diagram of the structure of the base station of Embodiment 7 of the present invention. The base station is a base station where user equipment is present when a link failure is observed by the user equipment (which is also a base station where the user equipment is present before the link of the user equipment fails). The base station may also be a base station again establishing connection with the user equipment successfully after the link of the UE fails. As shown in FIG. 7, the base station includes: a first receiving unit 701 and a first processing unit 702; wherein, the first receiving unit 701 is configured to receive identification information transmitted by other base stations or the user equipment, the identification information includes: identification associated with the user equipment and/or identification of the user equipment in the base station where the user equipment is present when the link failure is observed by the user equipment, with its function being as described in step 101 of Embodiment 1, and detailed identification information being as described in embodiments 1-4, which shall not be described herein any further;

and the first processing unit 702 is configured to determine that the link failure is resulted from a handover preparation failure when the base station determines that the identification information is stored in the base station.

In this embodiment, a manner of transmitting the identification information by the other base stations or the user equipment is as described in Embodiment 1; for example, in this embodiment, the identification information is included in a link failure indication message for transmission, or the identification information is included in a link failure report and transmitted via a link failure indication message.

In this embodiment, the identification associated with the user equipment is as described in Embodiment 1, which may be a unique identification associated with the user equipment, such as a shortMAC-I, and a identification of the user equipment in a base station where the user equipment is present when the user equipment observes the link failure, such as a C-RNTI; furthermore, the identification information is information used by the user equipment in attempting to reestablish connection, and the base station in attempting to reestablish connection with the user equipment may be any base station as described in the above embodiments, which shall not be described herein any further.

In this embodiment, after receiving the identification information, the first processing unit 702 looks up in a locally prestored identification information list for whether the identification information is stored in the identification information list; if yes, it shall be deemed that the link failure is resulted from a handover preparation failure.

Furthermore, the base station may further include a storing unit 703 configured to store an identification information list associated with the user equipment.

In this embodiment, if the base station determines that the link failure is resulted from a handover preparation failure, the first processing unit 702 ignores the link failure report. In this way, the base station will not determine that the link failure is resulted from a problem of setting of a handover parameter or a coverage problem, so that the network side may optimize the network more accurately.

It can be seen from the above embodiment that the base station may use the received identification information and locally stored information to determine that the link failure is resulted from a handover preparation failure, but not from a problem of setting of a handover parameter or a coverage problem, thereby the base station may ignore the link failure message, and assisting in optimizing the network more accurately.

Figure 8:
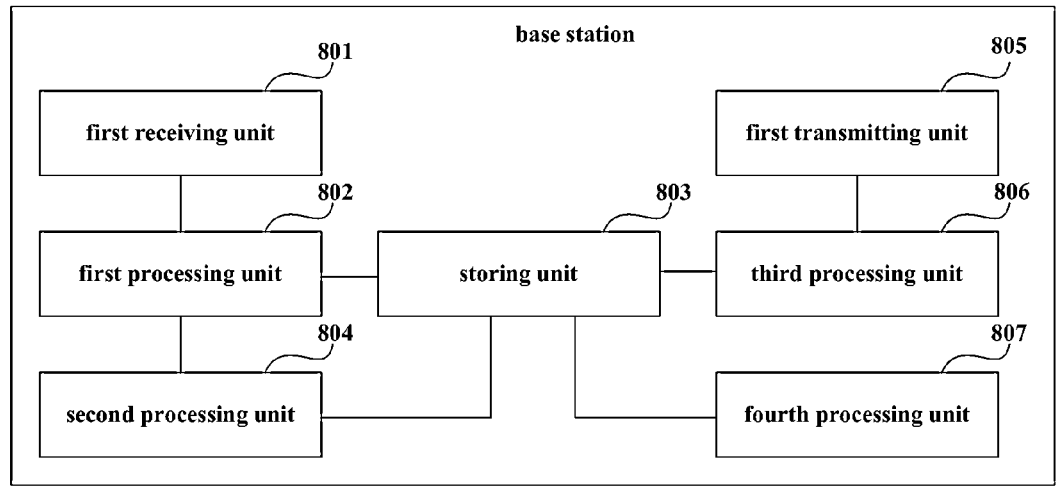
FIG. 8 is a schematic diagram of the structure of the base station of Embodiment 8 of the present invention.

FIG. 8 is a schematic diagram of the structure of the base station of Embodiment 8 of the present invention. The base station is a base station where user equipment is present when a link failure is observed by the user equipment. And the base station may also be a base station again establishing connection with the user equipment successfully after the link of the UE fails. As shown in FIG. 8, the base station includes: a first receiving unit 801, a first processing unit 802 and a storing unit 803, with the functions of them being similar to those in Embodiment 5, which shall not be described herein any further.

As shown in FIG. 8, the base station may further include a second processing unit 804 configured to delete the identification information stored in the base station when the first processing unit 802 determines that the identification information is prestored in the base station.

In this way, the base station may manage the information stored by it, thereby saving its storage space.

In this embodiment, the base station may first obtain the prestored identification information, that is, when the user equipment needs to be handed over, the base station where the user equipment is present (such as a base station A) cannot select an appropriate target base station and cannot transmit a handover command to the user equipment after initiating handover requests to all possible target base stations, i.e. neighboring base stations (such as base stations B and C), of the user equipment, (when user equipment needs to be handover, the base station where the user equipment is present will transmit handover requests to multiple user equipments at the same time); for example, the base station receives a corresponding handover preparation failure message for each handover request, and the base station where the user equipment is present (for example, the base station A shown in FIG. 1) will record the identification information associated with the user equipment (for example, an unique identification associated with a terminal corresponding to all the possible target base stations, such as a shortMAC-I list, and/or identification of a terminal in the base station A, such as a C-RBTI).

Hence, as shown in FIG. 8, the base station further includes: a first transmitting unit 805 and a third processing unit 806; wherein, the first transmitting unit 805 is configured to transmit handover requests to all possible target base stations before the link of the user equipment fails and when the user equipment is to be handed over;

and the third processing unit 806 is configured to store the identification information as follows when messages of handover preparation failure fed back by the target base stations are received: identification associated with the user equipment and/or identification of the user equipment in the base station; wherein, the information may be stored in a form of list in the storing unit 803.

Furthermore, in this embodiment, the base station may include a unit for transmitting handover requests to the target base stations, a unit for receiving handover preparation failure messages fed back by the neighboring base stations in response to the handover requests, and a unit for transmitting a handover command to the user equipment, which are similar to those in the relevant art, and shall not be described herein any further.

In this embodiment, as shown in FIG. 8, the base station further includes a fourth processing unit 807 configured to delete the stored identification information when the storage time of the identification information stored in the base station exceeds a predefined time.

Furthermore, before the link fails and after all the handover requests associated with the user equipment are rejected (the base station receives a corresponding handover preparation failure message for each handover request), the user equipment finishes a successful handover preparation in the same base station (for example, after the base station A where it is present transmit a handover request, the target base station B replies a handover request response message); in this case, the base station further includes a second transmitting unit and a fifth processing unit (not shown); wherein, the second transmitting unit is configured to transmit handover requests to the neighboring base stations, after messages of handover preparation failure fed back by the target base stations are received by the base station; and the fifth processing unit is configured to delete the identification information stored in the base station when reply messages of handover request fed back by the target base stations are received; in this embodiment, the detailed deleted identification information is as described in embodiments 1-4, which shall not be described herein any further.

It can be seen from the above embodiment that the base station may use the received identification information and locally stored information to determine that the link failure is resulted from a handover preparation failure, but not from a problem of setting of a handover parameter or a coverage problem, thereby the base station may ignore the link failure message, and assisting in optimizing the network more accurately; furthermore, the base station may further manage the information stored by it, thereby saving its storage space.

Figure 9:
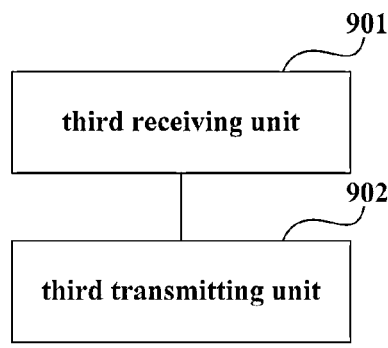
FIG. 9 is a schematic diagram of the structure of the base station of Embodiment 9 of the present invention.

FIG. 9 is a schematic diagram of the structure of the base station of Embodiment 9 of the present invention. The base station is a base station reestablishing connection with user equipment after a link of the UE fails. For example, the base station may be neighboring base stations of base station A, such as base stations B and C, may also be the base station A (referring to embodiments 7 and 8), and may also be a non-neighboring base station.

As shown in FIG. 9, the base station includes: a third receiving unit 901 and a third transmitting unit 902; wherein, the third receiving unit 901 is configured to receive identification information transmitted by user equipment after the base station establishes connection with the user equipment successfully; wherein, the identification information includes identification associated with the user equipment and/or identification of the user equipment in a base station where the user equipment is present when the link failure is observed by the user equipment, and the identification information is information used by the user equipment in attempting to reestablish connection after the link fails;

and the third transmitting unit 902 is configured to transmit the identification information to the base station where the user equipment is present when the link failure is observed by the user equipment.

In this embodiment, the UE may transmit the identification information to the base station directly, such as the identification information may be included in a link failure indication message for transmission.

Furthermore, the identification information may also be included in a link failure report for transmission to the base station via a link failure indication message. In this case, the third receiving unit 901 is configured to receive a link failure indication message transmitted by user equipment, and obtain the identification information in the link failure report from the message; and the third transmitting unit 902 is configured to transmit the link failure report including the identification information to the base station where the user equipment is present when the link failure is observed by the user equipment via the link failure indication message.

Furthermore, the base station may include a unit for establishing connection with the user equipment, with a process of establishing connection being similar to that in the relevant art and as described in Embodiment 4 and FIG. 6, which shall not be described herein any further.

Furthermore, in this embodiment, the base station may further include a unit for receiving a handover request transmitted by a base station where the user equipment is present when the link failure occurs in the user equipment, and a unit for feeding back a handover preparation failure message in response to the handover request.

It can be seen from the above embodiment that the base station may transmit the identification information of the user equipment to a base station where the user equipment is present when the user equipment observes the link failure, so that the base station where the user equipment is present when the user equipment observes the link failure uses the identification information and its stored information to determine whether it is a handover preparation failure, so as to determine accurately a cause of link failure, thereby assisting in optimization of the network performance.

Figure 10:
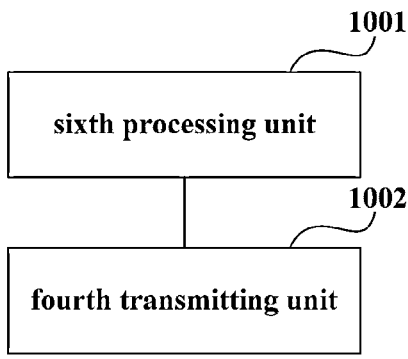
FIG. 10 is a schematic diagram of the structure of the user equipment of Embodiment 10 of the present invention.

FIG. 10 is a schematic diagram of the structure of the user equipment of Embodiment 10 of the present invention. As shown in FIG. 10, the user equipment includes: a sixth processing unit 1001 and a fourth transmitting unit 1002; wherein, the sixth processing unit 1001 is configured to generate, when a link failure occurs in the user equipment, identification information associated with the user equipment in attempting to reestablish connection with a base station attempting to reestablish connection; wherein, the identification information is as described in the above embodiments, which shall not be described herein any further; and the fourth transmitting unit 1002 is configured to transmit the identification information to a base station after connection with the base station is successfully established; wherein, the identification information may be transmitted to the base station via a link failure indication message, or be included in a link failure report and transmitted to the base station via a link failure indication message, which is as described in the above embodiments, and shall not be described herein any further.

In the above embodiment, the base station attempting to reestablish connection with the user equipment or establishing connection with the user equipment successfully may be any user equipment, which is as described in the above embodiments, and shall not be described herein any further.

Furthermore, the user equipment may further include a connection establishing unit configured to establish connection with the another user equipment, with a process of connection establishment being similar to that in the relevant art and as described in Embodiment 4 and FIG. 6, which shall not be described herein any further.

Furthermore, the user equipment may further include a connection reestablishing unit configured to reestablish connection with base station A, or a base station neighboring or not neighboring the base station A, with a process of connection reestablishment being similar to that in the relevant art and as described in Embodiment 4 and FIG. 5, which shall not be described herein any further.

It can be seen from the above embodiment that after establishing connection with a certain base station, the user equipment may transmit the identification information to the base station, and the base station transmits the identification information to a base station where the user equipment is present when the user equipment observes the link failure, so that the base station where the user equipment is present when the user equipment observes the link failure uses the identification information and its stored information to determine whether it is a handover preparation failure, so as to determine accurately a cause of link failure, thereby assisting in optimization of the network performance.

Figure 11:
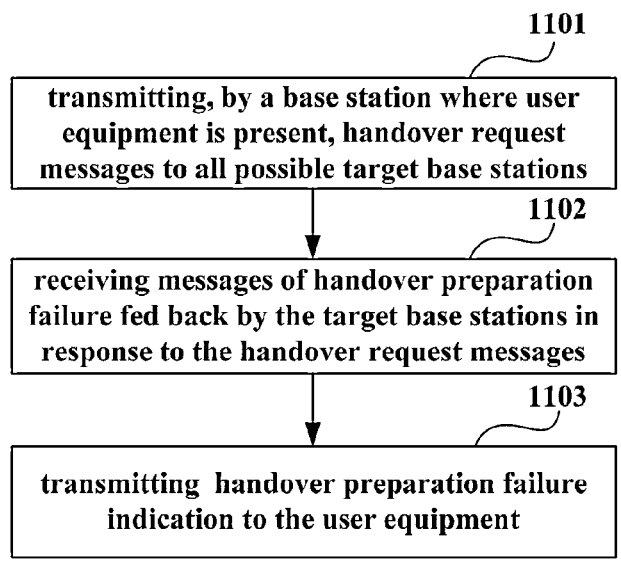
FIG. 11 is a schematic diagram of the method for analyzing cause of a link failure of Embodiment 11 of the present invention.

FIG. 11 is a schematic diagram of the method for analyzing cause of a link failure of Embodiment 11 of the present invention, which is addressed to a base station where the user equipment is present before the link fails (and is also a user equipment where the user equipment is present when the user equipment observes the link failure). As shown in FIG. 11, the method includes:

step 1101: transmitting, by a base station where the user equipment is present, when the user equipment is to be handed over, handover request messages to all possible target base stations;

in this embodiment, if a base station cannot select an appropriate target base station after initiating handover requests to all possible target base stations (neighboring base stations, such as base stations B and C shown in FIGS. 4A-4C) of user equipment, it will result in that a handover command cannot be transmitted to the user equipment, (when user equipment needs to be handover, the base station where the user equipment is present will transmit handover requests to multiple base stations at the same time);

step 1102: receiving messages of handover preparation failure fed back by the target base stations in response to the handover request messages; and step 1103: transmitting indication for handover preparation failure to the user equipment by the base station.

In this embodiment, for example, the base station receives a corresponding handover preparation failure message for each handover request, and the base station where the user equipment is present (for example, the base station A shown in FIG. 4A) will transmit indication for handover preparation failure to the user equipment.

After the link of the user equipment fails, the user equipment will select a cell and establish connection with a base station of the cell, and the base station establishing connection with the user equipment may be any base station, such as a base station where the user equipment is present when the user equipment observes the link failure.

In this case, the method further includes: receiving the indication for handover preparation failure transmitted by the user equipment, after the user equipment establishes connection with the base station successfully. This step is optional.

Furthermore, the base station establishing connection with the user equipment may be other base stations (neighboring or not neighboring this base station).

In this case, the method further includes: receiving the indication for handover preparation failure transmitted by the other base stations by the base station, after the user equipment establishes connection with the other base stations successfully. This step is optional;

wherein, if the indication for handover preparation failure is included in a link failure indication for transmission to the base station, the base station may receive the link failure indication including the indication for handover preparation failure transmitted by the user equipment or the other base stations, and ignore the link failure indication.

Figure 12:
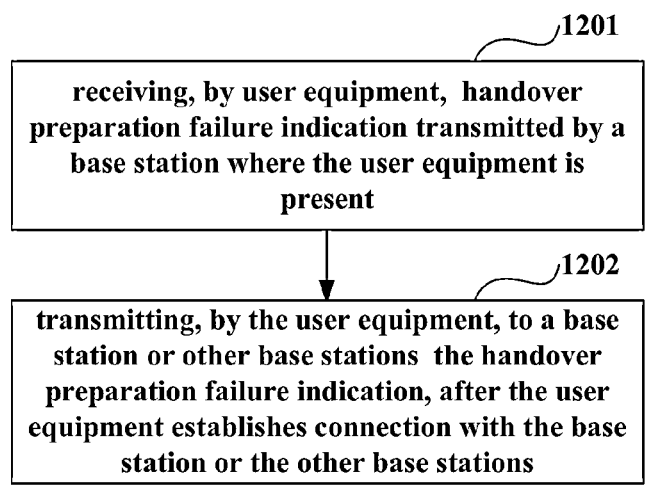
FIG. 12 is a schematic diagram of the method for analyzing cause of a link failure of Embodiment 12 of the present invention.

FIG. 12 is a schematic diagram of the method for analyzing cause of a link failure of Embodiment 12 of the present invention, which is address to user equipment. As shown in FIG. 12, the method includes:

step 1201: receiving, by user equipment, indication for handover preparation failure transmitted by a base station where the user equipment is present; and step 1202: transmitting, by the user equipment to a base station or other base stations after the link of the user equipment fails and the user equipment establishes connection with the base station or the other base stations, indication including the handover preparation failure.

In this embodiment, the indication for handover preparation failure may be included in a link failure report for transmission to the base station or other base stations via link failure indication, and may not included in the link failure report but may included together with the link failure report in a link failure indication message for transmission to the base station or other base stations.

Furthermore, after the link fails and before step 1202, the method may further include: attempting to reestablish connection with a base station by the user equipment, with the connection failing. The base station attempting to reestablish connection with the user equipment may be a base station where the user equipment is present when the user equipment observes the link failure, or a base station neighboring not nor neighboring the base station where the user equipment is present when the user equipment observes the link failure.

It can be seen from the above embodiment that the base station where the user equipment is present may transmit indication for handover preparation failure to the user equipment so that the user equipment transmits the indication for handover preparation failure to a network side (such as base station B) after successfully establishing RRC connection with a certain base station. In this way, the network side may determine that the link failure is resulted from a handover preparation failure, but not from a problem of setting of a handover parameter or a coverage problem, thereby assisting in optimizing the network.

Figure 13:
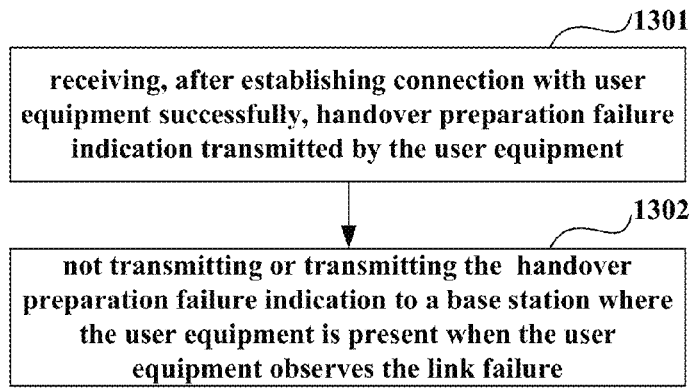
FIG. 13 is a schematic diagram of the method for analyzing cause of a link failure of Embodiment 13 of the present invention.

FIG. 13 is a schematic diagram of the method for analyzing cause of a link failure of Embodiment 13 of the present invention, which is address to a certain base station. As shown in FIG. 13, the method includes:

step 1301: receiving, after establishing connection with user equipment successfully, indication for handover preparation failure transmitted by the user equipment; and step 1302: not transmitting or transmitting the indication for handover preparation failure to a base station where the user equipment is present when the user equipment observes the link failure.

In this embodiment, the indication for handover preparation failure may be included in a link failure indication for not transmission to the base station where the user equipment is present when the user equipment observes the link failure.

It can be seen from the above embodiment that the user equipment transmits the indication for handover preparation failure to a network side (such as base station B) after successfully establishing RRC connection with a certain base station. In this way, the network side may determine that the link failure is resulted from a handover preparation failure. At this moment, the base station does not transmit the indication for handover preparation failure to the base station where the user equipment is present when the user equipment observes the link failure. Furthermore, the base station may transmit the indication for handover preparation failure to the base station where the user equipment is present when the user equipment observes the link failure.

The method for analyzing cause of a link failure of the embodiment of the present invention shall be described below in particular scenarios with reference to the accompanying drawings. For example, when a link failure occurs in user equipment (also when it observes the link failure), the base station where the user equipment is present is base station A; in this embodiment, neighboring base stations of the base station A may include base stations B and C; and in an actual network system, the number of the neighboring base stations may be more than two, with a process of analysis being similar to the case including two neighboring base stations. Description shall be given herein taking the neighboring base stations include base stations B and C as an example.

In this embodiment, when a link of the user equipment fails, the user equipment attempts to reestablish connection with a neighboring base station (such as the base station B or base station C), the base station A, or other base stations, and successfully establishes connection with a base station after the attempting to reestablish connection fails. The base station may be the neighboring base station B or C, may also not a neighboring base station, and may be the base station A. in the following embodiments, description is given taking that the user equipment selects to attempt to reestablish connection with the neighboring base station B and selects to establish RRC connection with the neighboring base station B as examples.

Figure 14A:
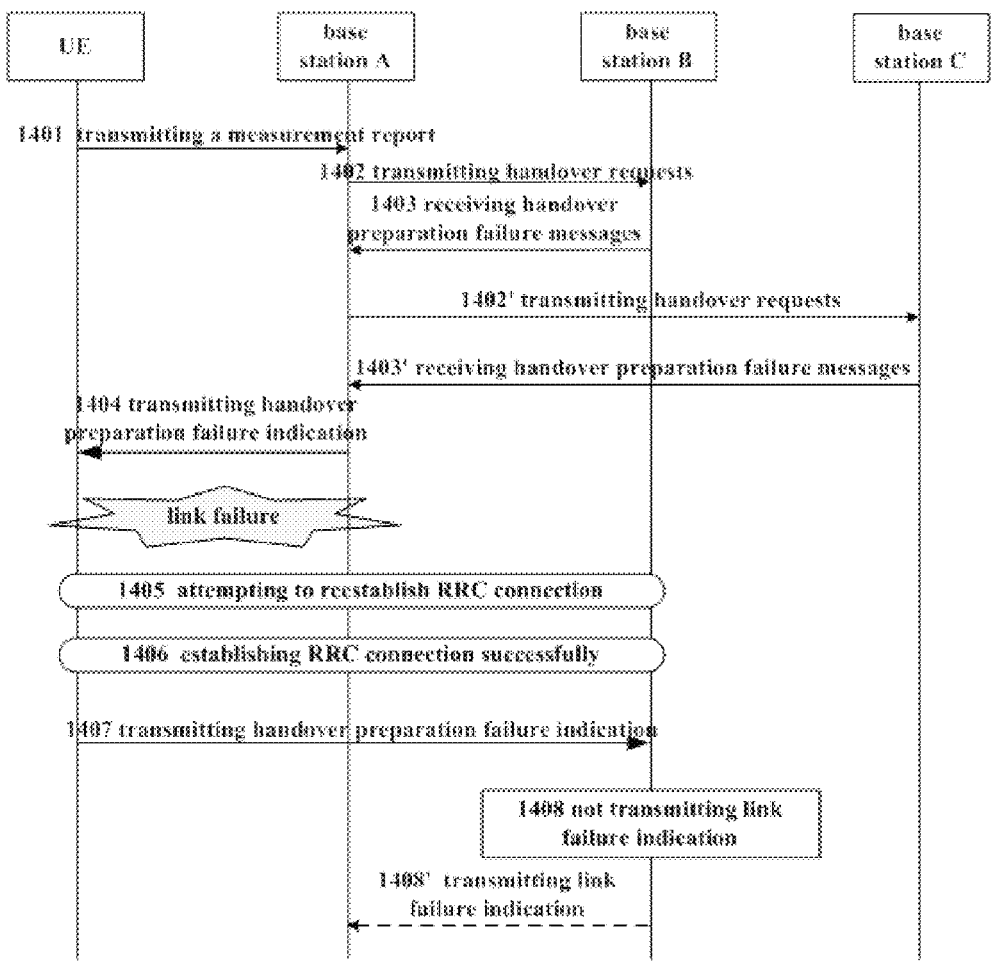
FIG. 14A is a schematic diagram of the method for analyzing cause of a link failure of Embodiment 14 of the present invention.

FIG. 14A is a schematic diagram of the method for analyzing cause of a link failure of Embodiment 14 of the present invention. As shown in FIG. 14A, the method includes:

step 1401: transmitting a measurement report by the user equipment to the base station A where the user equipment is present;

in this embodiment, it is similar to step 401 shown in FIG. 4A, which shall not be described herein any further;

the measurement report may include a measurement result of a local cell, or a measurement result of a neighboring cell, which are similar to the relevant art, and shall not be described herein any further;

steps 1402 and 1402': transmitting handover requests to multiple target base stations by the base station A where the user equipment is present when the user equipment needs to be handed over;

in this embodiment, the base station A transmits the handover requests to the neighboring base stations B and C;

steps 1403 and 1403': feeding back handover preparation failure messages to the base station A by the base stations B and C after receiving the handover requests;

step 1404: transmitting handover preparation failure indication to the user equipment by the base station A after receiving the handover preparation failure messages;

step 1405: attempting to reestablish connection with its base station by the user equipment after the link fails;

in this embodiment, RRC connection reestablishment is performed; for example, the base station B is selected for the attempt to reestablish connection; however, as there exists no context of the user equipment in the base station B, the connection reestablishment fails; refer to step 405 in FIG. 4A and FIG. 5 for a detailed process, which shall not be described herein any further;

step 1406: establishing RRC connection successfully with a base station by the user equipment;

in this embodiment, the base station establishing RRC connection with the user equipment successfully may be the base station A, the base station B or C, or other base stations; for example, the UE selects to establish connection with the base station B, with a detailed process being as described in step 406 in FIG. 4A and FIG. 6, which shall not be described herein any further;

step 1407: transmitting the indication for link failure by the user equipment to the network side (i.e. the base station B) after the user equipment establishes RRC connection successfully with the base station B;

in this embodiment, the indication for handover preparation failure may be included in a link failure report for transmission via a link failure indication message; furthermore, the indication for handover preparation failure may be included in a link failure indication message for transmission;

step 1408: not transmitting the indication for link failure by the base station B to the base station A after the base station B receives the handover preparation failure indication;

or, in this embodiment, the method includes step 1408': after receiving the handover preparation failure indication by the base station B, the handover preparation failure indication may be included in a link failure indication by the base station B for transmission to the base station A.

Figure 14B:
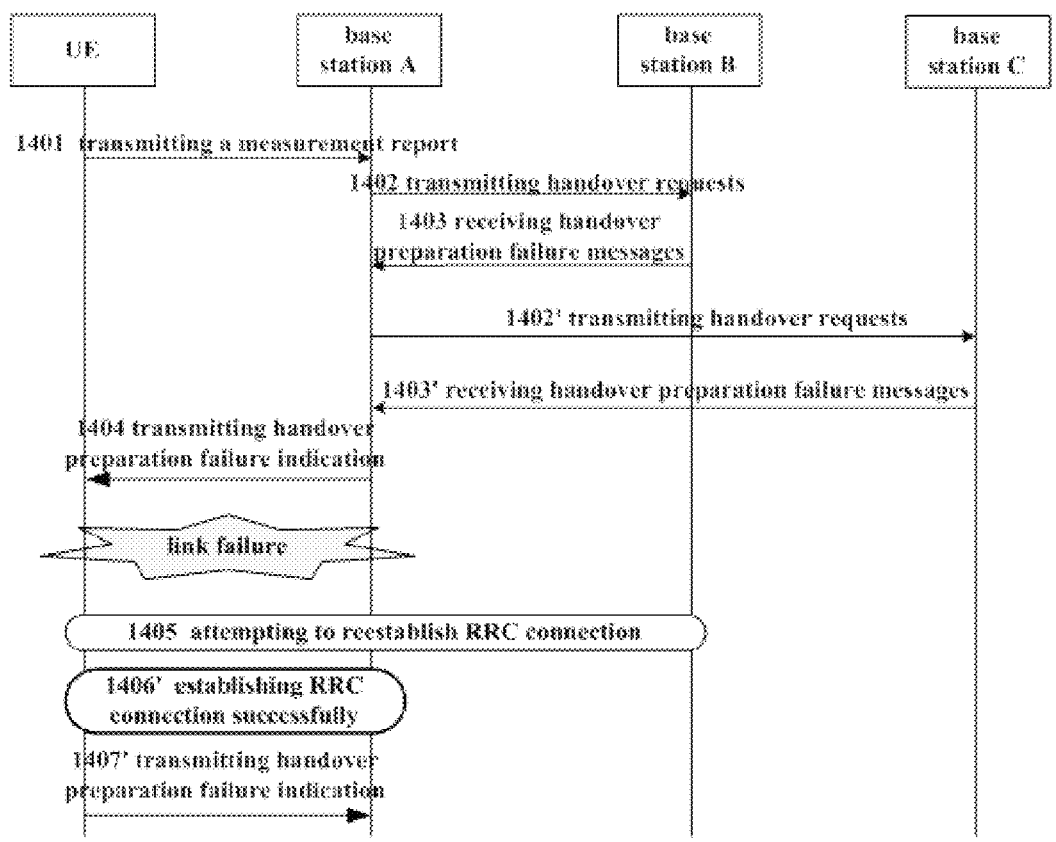
FIG. 14B is a schematic diagram of the method for analyzing cause of a link failure of Embodiment 15 of the present invention.

FIG. 14B is a schematic diagram of the method for analyzing cause of a link failure of Embodiment 15 of the present invention. Embodiment 15 differs from Embodiment 14 shown in FIG. 14A in that in step 1406', the UE selects to establish connection with the base station A, and establishes connection successfully; and in step 1407', the UE transmits the handover preparation failure indication to the base station A, this step being optional.

Figure 14C:
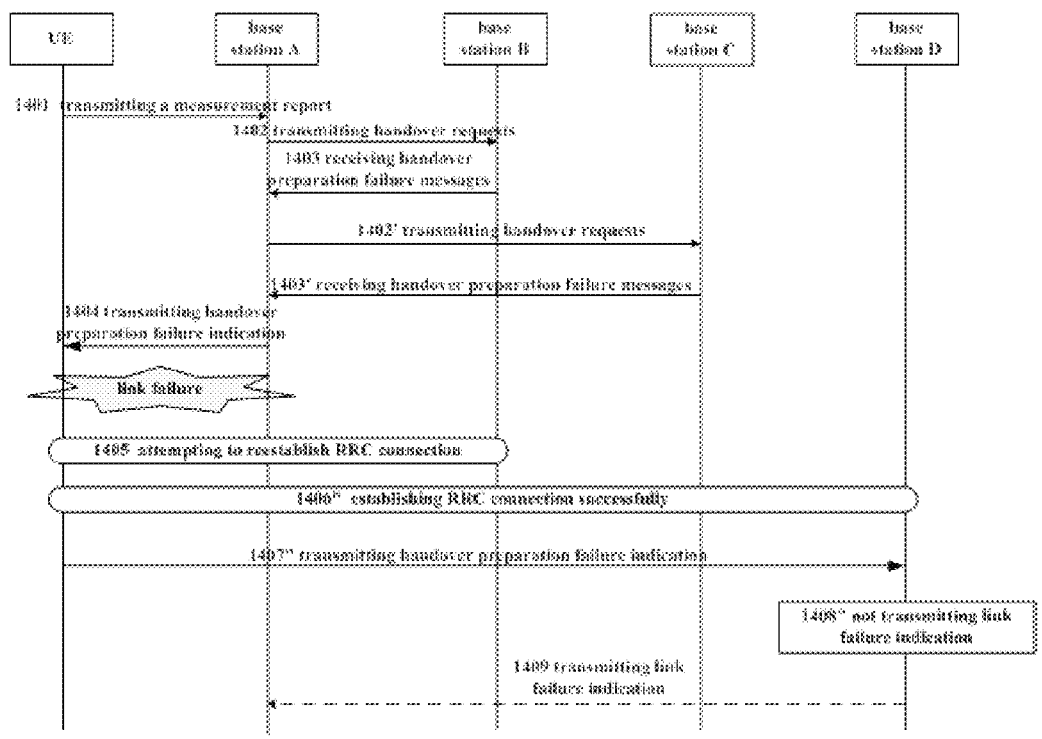
FIG. 14C is a schematic diagram of the method for analyzing cause of a link failure of Embodiment 16 of the present invention.

FIG. 14C is a schematic diagram of the method for analyzing cause of a link failure of Embodiment 16 of the present invention. Embodiment 16 differs from Embodiment 14 shown in FIG. 14A in that in step 1406", the UE selects to establish connection with base station D, and establishes connection successfully; in step 1407", the UE transmits the handover preparation failure indication to the base station D, the base station D being not a neighboring base station of the base station A; in step 1408", the base station D does not transmit the handover preparation failure indication to the base station A; and furthermore, in optional step 1409", the base station D transmits the handover preparation failure indication to the base station A.

It can be seen from the above embodiments that the UE transmits the handover preparation failure indication to a base station after receiving a handover preparation failure indication transmitted by the base station A and establishes connection with the base station. In this way, after receiving the indication, the base station may transmit or not transmit the handover preparation failure indication to the base station where the user equipment is present when the link failure occurs in the user equipment. Therefore, the base station may determine that the link failure is resulted from a handover preparation failure, but not from a problem of setting of a handover parameter or a coverage problem, so that the base station may ignore the link failure message, thereby assisting in optimizing the network more accurately.

A person of ordinary skill in the art may understand that all or part of the steps in the method carrying out the above embodiment may be carried out by related hardware instructed by a program. The program may be stored in a computer-readable storage medium. And when being executed, the program may include all or part of the steps in the method in the above embodiments, and the storage medium may include an ROM, an RAM, a floppy disc, and a compact disc, etc.

Embodiments of the present invention further provide a base station and user equipment, as described in the embodiments below. As the principles of the base station and the user equipment for solving problems are similar to those of the above methods for analyzing cause of a link failure based on a base station and user equipment, the implementation of the methods may be referred to for the implementation of the base station and user equipment, and the repeated parts shall not be described any further.

Figure 15:
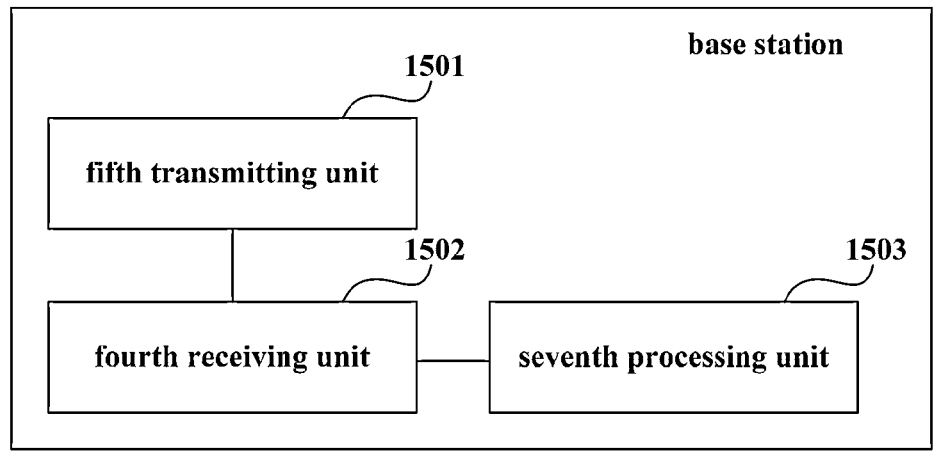
FIG. 15 is a schematic diagram of the structure of the base station of Embodiment 17 of the present invention.

FIG. 15 is a schematic diagram of the structure of the base station of Embodiment 17 of the present invention. The base station is a base station where the user equipment is present before a link fails (a base station where the user equipment is present when the user equipment observes the link failure), such as base station A. As shown in FIG. 15, the base station includes: a fifth transmitting unit 1501, a fourth receiving unit 1502 and a seventh processing unit 1503; wherein, the fifth transmitting unit 1501 is configured to transmit handover request messages to all possible target base stations when user equipment is to be handed over before a link fails;

the fourth receiving unit 1502 is configured to receive messages of handover preparation failure fed back by the target base stations in response to the handover request messages;

and the seventh processing unit 1503 is configured to transmit indication for handover preparation failure to the user equipment.

A process of operation of the base station is as described in Embodiment 11 shown in FIG. 11, which shall not be described herein any further.

Furthermore, the base station may further include a fifth receiving unit (not shown) configured to receive the indication for handover preparation failure transmitted by other base stations, after the user equipment establishes connection with the other base stations successfully. At this moment, if the indication is included in a link failure indication for transmission, or the indication is included in a link failure report and transmitted via a link failure indication, the base station may ignore the link failure indication.

In another embodiment, after the link of the user equipment fails, when the user equipment establishes connection with the base station successfully, the fifth receiving unit is configured to receive the indication for handover preparation failure transmitted by the user equipment, after the user equipment establishes connection with the base station successfully. In the above embodiment, the fifth receiving unit is optional.

Figure 16:
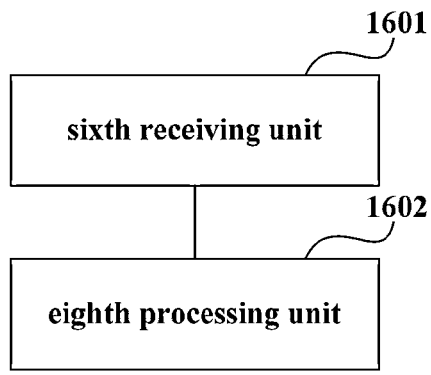
FIG. 16 is a schematic diagram of the structure of the user equipment of Embodiment 18 of the present invention.

FIG. 16 is a schematic diagram of the structure of the user equipment of Embodiment 18 of the present invention. As shown in FIG. 16, the user equipment includes: a sixth receiving unit 1601 and an eighth processing unit 1602; wherein, the sixth receiving unit 1601 is configured to receive an indication for handover preparation failure transmitted by a base station where the user equipment is present; and the eighth processing unit 1602 is configured to transmit the indication for handover preparation failure to a base station or other base stations after the link fails and the user equipment establishes connection with the base station or other base stations; wherein, the indication for handover preparation failure may be included in a link failure report for transmission to the other base stations.

Furthermore, the user equipment may further include a connection establishing unit configured to establish connection with the base station or the other base stations, with a process of connection establishment being similar to that in the relevant art and as described in Embodiment 4 and FIG. 6, which shall not be described herein any further.

Furthermore, the user equipment may include a connection reestablishing unit configured to attempt to reestablish connection with a neighboring base station when a link of the user equipment fails, with a process of connection establishment being similar to that in the relevant art and as described in Embodiment 4 and FIG. 5, which shall not be described herein any further.

Figure 17:
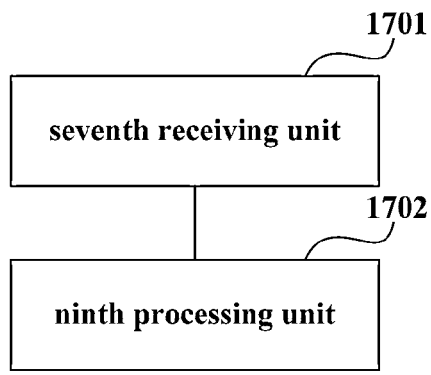
FIG. 17 is a schematic diagram of the structure of the base station of Embodiment 19 of the present invention.

FIG. 17 is a schematic diagram of the structure of the base station of Embodiment 19 of the present invention. The base station is a base station establishing connection with user equipment successfully, which may be a neighboring base station, such as base station B or C, and may not be the neighboring base station. As shown in FIG. 17, the base station includes: a seventh receiving unit 1701 and a ninth processing unit 1702; wherein, the seventh receiving unit 1701 is configured to receive indication for handover preparation failure transmitted by user equipment after the base station establishes connection with the user equipment successfully;

and the ninth processing unit 1702 is configured not to transmit or transmit the indication for handover preparation failure to the base station where the user equipment is present when the user equipment observes the link failure.

Furthermore, the base station may include a connection establishing unit configured to establish connection with user equipment, with a process of connection establishment being similar to that in the relevant art and as described in Embodiment 4 and FIG. 6, which shall not be described herein any further.

It can be seen from the above embodiments that the base station A wherein the user equipment is present transmits the handover requests to the neighboring base stations when the user equipment is to be handed over. After receiving the handover preparation failure messages, the base station A transmits the indication for handover preparation failure to the user terminal, so that the user equipment transmits a link failure report carrying the indication for handover preparation failure to a base station after establishing connection with the base station. In this way, after receiving the link failure report, the base station may transmit or not transmit the link failure report to a base station where the user equipment is present when the link failure occurs in the user equipment. Therefore, the base station may determine that the link failure is resulted from a handover preparation failure, but not from a problem of setting of a handover parameter or a coverage problem, so that the base station may ignore the link failure message, thereby assisting in optimizing the network more accurately.

An embodiment of the present invention further provides a computer-readable program, wherein when the program is executed in a base station, the program enables a computer to carry out the method for analyzing cause of a link failure as described in embodiments 1, 2, 4-6, 11, 13 and 14-16 in the base station.

An embodiment of the present invention further provides a storage medium in which a computer-readable program is stored, wherein the computer-readable program enables a computer to carry out the method for analyzing cause of a link failure as described in embodiments 1, 2, 4-6, 11, 13 and 14-16 in a base station.

An embodiment of the present invention further provides a computer-readable program, wherein when the program is executed in user equipment, the program enables a computer to carry out the method for analyzing cause of a link failure as described in embodiments 3, 4-6, 12 and 14-16 in the user equipment.

An embodiment of the present invention further provides a storage medium in which a computer-readable program is stored, wherein the computer-readable program enables a computer to carry out the method for analyzing cause of a link failure as described in embodiments 3, 4-6, 12 and 14-16 in user equipment.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A base station, which is a base station where user equipment is present when a link failure is observed by the user equipment, the base station comprising:
    a receiving unit configured to receive identification information transmitted by other base stations or the user equipment, the identification information associated with the user equipment including: identification of the user equipment used in the base station where the user equipment is present when the link failure is observed by the user equipment; and
    a first processing unit configured to determine that the link failure is the result of a handover preparation failure when the base station determines that the identification information is stored in the base station.

2. The base station according to claim 1, wherein the identification information is included in a link failure report, and the first processing unit ignores the link failure report.

3. The base station according to claim 1, wherein the base station further comprises a second processing unit configured to delete the identification information stored in the base station.

4. The base station according to claim 1, wherein the base station further comprises:
    a first transmitting unit configured to transmit to all possible target base stations handover requests before the link of the user equipment fails and when the user equipment is to be handed over; and
    a third processing unit configured to store the identification information when messages of handover preparation failure fed back by the target base stations are received.

5. The base station according to claim 4, wherein the base station further comprises a fourth processing unit configured to delete the stored identification information when the storage time of the identification information stored in the base station exceeds a predefined time.

6. The base station according to claim 4, wherein the base station further comprises:
    a second transmitting unit configured to transmit handover requests to the target base stations, after messages of handover preparation failure fed back by the target base stations are received; and
    a fifth processing unit configured to delete the identification information stored in the base station when a reply message of handover request fed back by at least one target base station is received.

7. A base station, comprising:
    a receiving unit configured to receive a link failure report including identification information transmitted by user equipment after the base station establishes connection with the user equipment successfully, the identification information associated with the user equipment including: identification of the user equipment used in another base station where the user equipment is present when a link failure is observed by the user equipment; and a transmitting unit configured to transmit the identification information to the another base station where the user equipment is present when the link failure is observed by the user equipment.

8. The base station according to claim 7, wherein the identification information is information used by the user equipment in attempting to reestablish connection after the link fails.

9. User equipment, comprising:
a processing unit configured to generate, when a link failure occurs in the user equipment, identification information associated with the user equipment in attempting to reestablish connection; and
a transmitting unit configured to transmit a link failure report including the identification information to a base station after connection with the base station is successfully established, the identification information associated with the user equipment including: identification of the user equipment used in the base station or another base station where the user equipment is present when the link failure is observed by the user equipment.

10. User equipment, comprising:
a receiving unit configured to receive indication for handover preparation failure transmitted by a base station where the user equipment is present; and
a processing unit configured to transmit to the base station or other base stations the indication for handover preparation failure when a link fails and after the user equipment establishes connection successfully with the base station or other base stations.

11. A base station, comprising:
a receiving unit configured to receive indication for handover preparation failure transmitted by user equipment after the base station establishes connection with the user equipment successfully; and
a processing unit configured to transmit the indication for handover preparation failure to another base station where the user equipment is present when a link failure is observed by the user equipment.

* * * * *